United States Patent
Schreib et al.

(10) Patent No.: US 6,314,299 B1
(45) Date of Patent: Nov. 6, 2001

(54) METHOD AND HOME BASE STATION FOR SETTING UP CONNECTIONS FOR A MOBILE STATION USING AN ORGANIZATION CHANNEL AND STATION IDENTIFIERS

(75) Inventors: Franz Schreib; Jochen Helms, both of München (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 09/431,530

(22) Filed: Nov. 1, 1999

Related U.S. Application Data (63) Continuation of application No. PCT/DE98/01129, filed on Apr. 22, 1998.

(30) Foreign Application Priority Data

Apr. 30, 1997 (DE) ............................................... 197 18 475

(51) Int. Cl.[7] ......................................................... H04Q 7/20
(52) U.S. Cl. ........................ 455/465; 455/435; 455/411; 455/450
(58) Field of Search ..................................... 455/410, 411, 455/435, 432, 465, 455, 516, 450, 509, 436, 517, 414, 444

(56) References Cited

U.S. PATENT DOCUMENTS

| 5,175,758 | * | 12/1992 | Levanto et al. | 379/57 |
|---|---|---|---|---|
| 5,301,356 | * | 4/1994 | Bodin et al. | 455/436 |
| 5,463,672 | * | 10/1995 | Kage | 455/458 |
| 5,630,209 | * | 5/1997 | Wizgall et al. | 455/66 |
| 5,675,629 | * | 10/1997 | Raffel et al. | 455/426 |
| 5,732,348 | * | 3/1998 | Norimatsu | 455/434 |
| 5,822,693 | * | 4/1995 | Harrison | 455/432 |
| 5,867,124 | * | 2/1999 | Sointula | 370/50 |

FOREIGN PATENT DOCUMENTS

| 4307966A1 | | 9/1994 | (DE) . | |
| 2285556A | | 7/1995 | (GB) . | |
| 2285556A | * | 12/1995 | (GB) | H04Q/7/30 |
| 95/02927 | | 1/1995 | (WO) . | |
| 97/11567 | | 3/1997 | (WO) . | |

* cited by examiner

Primary Examiner—William Trost
Assistant Examiner—Tilahun Gesesse
(74) Attorney, Agent, or Firm—Herbert L. Lerner; Laurence A. Greenberg; Werner H. Stemer (57) ABSTRACT

When a mobile station first initiates a connection, the mobile station is synchronized on the basis of an evaluation of an organization channel in the mobile radio network. The mobile station transmits, in a frequency band of a home base station and to the home base station a message that contains a mobile-station-specific first identifier. The message is received and evaluated by the home base station. If the first identifier matches a second identifier registered for the home base station, a connection is set up between the mobile station and the home base station.

12 Claims, 5 Drawing Sheets

METHOD AND HOME BASE STATION FOR SETTING UP CONNECTIONS FOR A MOBILE STATION USING AN ORGANIZATION CHANNEL AND STATION IDENTIFIERS

CROSS-REFERENCE TO RELATED APPLICATION

This is a continuation of copending International Application PCT/DE98/01129, filed Apr. 22, 1998, which designated the United States.

BACKGROUND OF THE INVENTION

Field of the Invention

The invention lies in the telecommunications field. More specifically, the invention relates to a method and a home base station for setting up connections for a mobile station in a mobile radio network, whereby the setting up of the connection can be initiated by the home base station or by the mobile station.

Radio communications systems are formed, for example, by mobile radio systems, wireless telephony systems or by radio stations for wireless subscriber connection (RITL radio in the local loop). Mobile radio networks allow communications connections to be set up to mobile subscribers, wireless telephony systems connect specific mobile terminals in the home area, while radio stations for wireless subscriber connection set up communications connections to stationary subscribers. A radio station on the network side is called a base station.

Communications connections are set up and maintained by signaling and wanted information being transmitted via a radio interface. If a plurality of subscribers using the same carrier frequency in the radio interface are separated by different time slots, this is a time-division multiplex system. The time-division multiplex method is referred to as the TDMA (time division multiple access) method. If subscriber signals for different connections are transmitted simultaneously but in different frequency bands, then this is a frequency-division multiplex system (FDMA=frequency division multiple access).

One known mobile radio system is, for example, the GSM (Global System for Mobile Communications) mobile radio network. In addition to time-division multiplex and frequency-division multiplex, other methods may also be used to separate the subscribers at the radio interface. Alternatively or additionally to the the methods for subscriber separation, specific codes may also be used for each communications connection.

A base station is a remote unit, which is normally connected on the network side by wires to other network components, and which is connected via the radio interface to the terminal or some other radio station.

International PCT publication WO 95/02927 discloses a method in which SIM cards (SIM=subscriber identification module) are used to store not only the subscriber number, telephone number and authentication code, but also settings of transmitting/receiving devices in a mobile station and in a home base station. The home base station is thereby connected to a wire-based communications network.

A wireless communications connection can be set up between the mobile station and the home base station by setting the frequency band and transmission power, without any major interference of the surrounding mobile radio network. The tuning to a specific frequency band and the synchronization are, however, related only to the stored settings. The flexibility and accuracy of the communications connection between a mobile station and a home base station is thus limited.

British patent application GB 2 285 556 A and international PCT publication WO 97/11567 disclose radio communications systems with base stations that can be connected to the fixed network for setting up connections to mobile stations. Dedicated synchronization methods are used for that purpose between the base stations and the mobile stations.

A further possibility for parallel use of home base stations and base stations in a mobile radio network is so-called dual-mode terminals, which are designed to set up connections to home base stations via a wireless connection in accordance with the DECT standard (DECT=digital enhanced cordless telephony) and, in addition, for setting up connections to base stations in the mobile radio network in accordance with the GSM Standard. Mutual interference between the various radio interfaces is low, since different frequency bands are used. However, the preparation of radio transmission and signal processing in accordance with both standards involves increased complexity in the mobile stations, leading to less economic solutions.

SUMMARY OF THE INVENTION

It is accordingly an object of the invention to provide a method of setting up connections and a home base station, which overcome the above-mentioned disadvantages of the heretofore-known devices and methods of this general type and which, with little financial cost, allows connections to be set up flexibly and reliably between a mobile station and a home base station.

With the foregoing and other objects in view there is provided, in accordance with the invention, a method of establishing a connection for a mobile station in a mobile radio network, wherein a plurality of base stations are provided in the mobile radio network, and at least one home base station for supplying small cells, and wherein the mobile stations transmit to the home base station in an uplink direction, and the home base station transmits to the mobile station in a downlink direction. The method comprises the following steps:

synchronizing a mobile station and a home base station based on an evaluation of an organization channel in the mobile radio network;

transmitting with the mobile station a message in the uplink direction to the home base station in a frequency band of the home base station, the message containing a mobile-station-specific first identifier;

receiving and evaluating the message by the home base station; and if the first identifier matches a second identifier registered for the home base station, setting up the connection between the home base station and the mobile station.

The setting up of a connection can be initiated by the mobile station in a mobile radio network or by the home base station. Mobile-station-specific identifiers are introduced for this purpose, which define the assignment of a mobile station to a specific home base station. Transmission from the mobile station to the home base station, as conventional, is referred to as the uplink direction and the transmission from the home base station to the mobile station is referred to as the downlink direction. The home base station is intended for supplying small cells in addition to radio cells supplied by base stations in the mobile radio network.

According to the invention, when a connection is set up initiated by the mobile station, the mobile station is synchronized on the basis of an evaluation of an organization channel in the mobile radio network. The mobile station transmits in a frequency band of the home base station and to this home base station a message, which contains a mobile-station-specific first identifier and is received and evaluated by the home base station. If the first identifier matches a second identifier registered for the home base station, the connection is set up.

The synchronization of the mobile station and the identifier request result in the setting up of a connection being initiated with little complexity and adequate accuracy. The evaluation of requests to set up connections can be carried out by the home base station using methods known from the mobile radio network.

The use of the organization channel in the mobile radio network means that no dedicated channel is required in the home base station for this purpose. Furthermore, the production costs of the home base station are reduced, since the requirements for an internal time and frequency norm are less stringent.

In accordance with an added feature of the invention, the method further comprises providing with the mobile station a changeover between a first operating mode relevant to the home base station and a second operating mode relevant to the base stations in the mobile radio network. Since the charge structure of the mobile radio network and the further network—for example a fixed network—to which the home base station is connected may differ, it is thus possible for the subscriber to decide to use a specific network. The changeover can be carried out manually via keypad functions on the mobile station, or in accordance with a stored priority list if the version with the highest priority is not available.

In an alternative initiation direction, the connection may be set up by:

selecting a free channel with the home base station;

transmitting a message with the home base station in a downlink direction, the message containing a mobile-station-specific second identifier;

receiving and evaluating the message in the mobile station; and if the second identifier matches a first identifier assigned to the mobile station, setting up a connection between the home base station and the mobile station.

In other words, when the setting up of a connection is initiated by the home base station, then, according to the invention, the home base station selects a free channel in a frequency band assigned to it, after which the home base station transmits a message which contains a mobile-station-specific second identifier. This message is received and evaluated by the mobile station. If the second identifier matches a first identifier assigned to the mobile station, the connection is set up.

For the subscriber, the home base station can carry out a conversion of a telephone number or a ringing signal within the network to the mobile-station-specific second identifier. The mobile station can thus be called from outside the mobile radio network with little change complexity, and it is possible to set up a connection, possibly with lower charges.

In accordance with an additional feature of the invention, the mobile station is synchronized to the home base station based on an evaluation of an organization channel in the mobile radio network.

In other words, the synchronization of the home base station is carried out on the basis of the evaluation of the organization channel in the mobile radio network. This organization channel contains at least information relating to one of the following parameters for tuning internal oscillators or control devices: time, frequency or subscriber code (for CDMA). The existing infrastructure of the mobile radio network can thus be used for tuning the home base station. Methods for tuning the mobile stations may in this case be transferred from the home base station.

In accordance with another feature of the invention, a third identifier is received in the home base station from the communications network, and the second identifier is derived therefrom.

With the above and other objects in view there is also provided, in accordance with the invention, a home base station connected to a subscriber connection of a communications network, comprising:

a transmitting/receiving device for a carrier for transmitting and receiving radio-frequency signals via a radio interface to a mobile station in accordance with a digital mobile radio standard;

a signal processing device connected to the transmitting/receiving device;

a device connected to the signal processing device for data rate conversion between a data rate of the mobile radio standard and a data rate of the communications network; and a device for synchronization of a radio transmission by evaluation of an organization channel in a mobile radio network.

In accordance with a further feature of the invention, the signal processing device is programmed to evaluate a message containing a mobile-station-specific first identifier received from a mobile station and, if the first identifier matches a second identifier registered for the home base station, to authorize a connection to be set up to the mobile station.

According to advantageous refinements of the invention, a subscriber-related plug-in card (SIM card), which normally provides subscriber-related data in the mobile station, is used by briefly inserting it into a read device in the home base station in order to load the second identifier into the home base station, or the first identifier of the mobile station is defined, and stored in it, via a signaling dialog between the mobile station and the home base station. This allows the assignment between the mobile station and the home base station to be made flexible.

If the first and second identifiers are permanently programmed in, the two appliances can be offered as a set. Particularly for the mobile station, it is also possible to provide for the first identifier to be reset by making an input via the keypad, or by signaling from the network. The second identifier may carry a validity tag such as, for instance, identifying an expiry date so that the assignment is cancelled after a predetermined time or if the operating voltage fails. This validity duration can be offered by the home base station on the basis of the various authorization criteria for different user groups (occupier of a dwelling—long; business colleague on a visit—short; etc).

A home base station may also have a plurality of second identifiers available, with the called mobile station being selected on the basis of one or more selection digits when a call arrives from the network.

In accordance with again an added feature of the invention, a device for transmission power adjustment is connected to the transmitting/receiving device. In a preferred development, the transmission power of the mobile station is controlled via a radio interface by the device for transmission power adjustment. The transmission power controller, which can be matched to the individual reception conditions, allows lower transmission power levels to be set in the mobile station for the small cell in comparison with the mobile radio network, and reduces the interference for other communications connections.

In accordance with again an additional feature of the invention, the transmitting/receiving device has an additional monitoring channel. The additional monitoring channel for the mobile station in the small cell may be provided by a transmitting/receiving device in the home base station. This additional monitoring channel additionally allows transmission parameters to be set on the radio interface between the mobile station and the home base station, depending on the transmission conditions.

In accordance with a concomitant feature of the invention, the free channel is selected in a frequency band assigned to the home base station.

Other features which are considered as characteristic for the invention are set forth in the appended claims.

Although the invention is illustrated and described herein as embodied in a method and home base station for setting up connections for a mobile station, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

Figure 1:
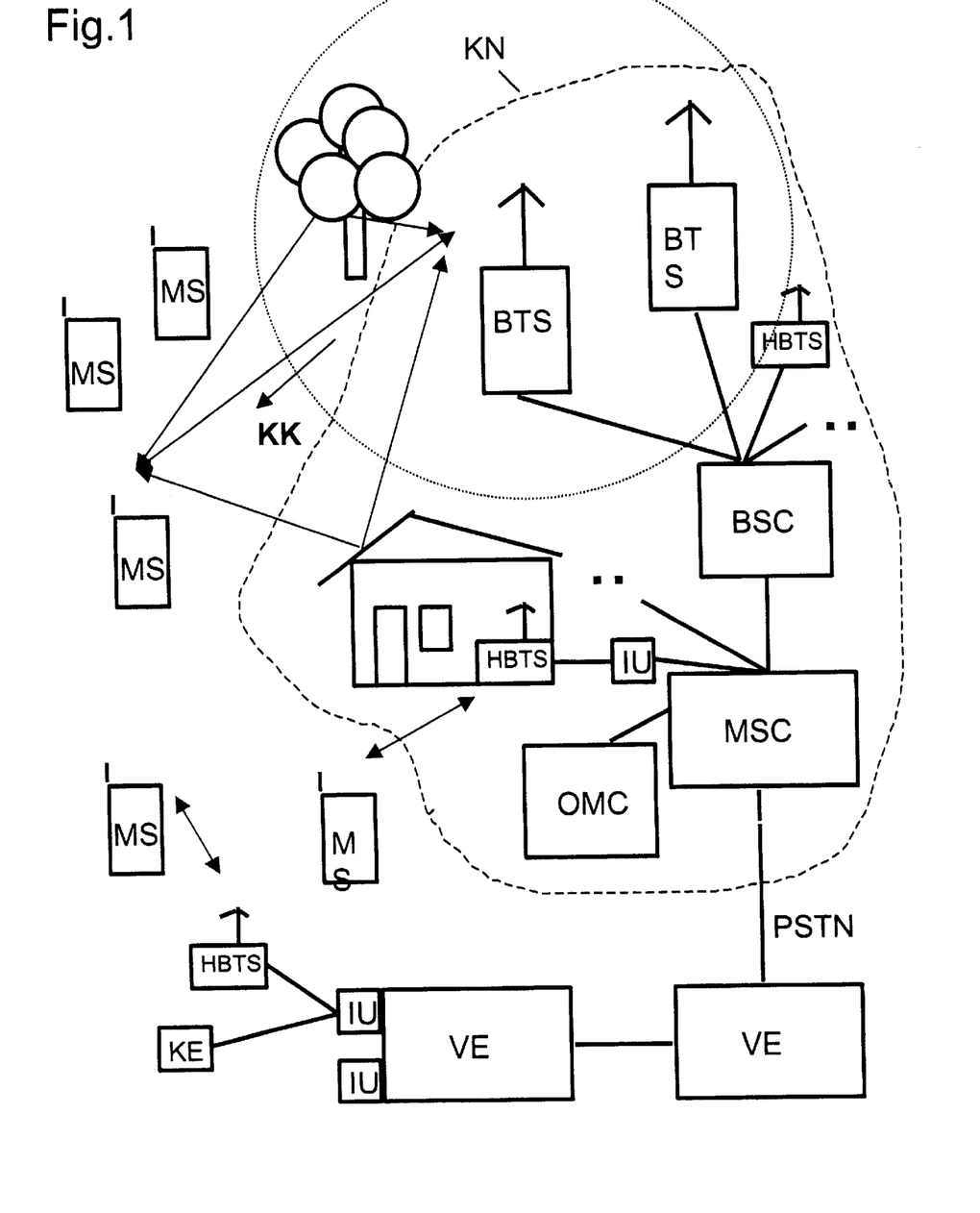
FIG. 1 is a schematic illustration of a mobile radio network and of a further communications network.

Referring now to the figures of the drawing in detail and first, particularly, to FIG. 1 thereof, there is seen a mobile radio network which, by way of example, represents a GSM standard mobile radio network. Reference is had, in this context, to J. Biala, "Mobilfunk und intelligente Netze" [Mobile Radio and Intelligent Networks], Vieweg Verlag Wiesbaden/Braunschweig, 1995. The mobile radio network comprises at least one mobile switching center MSC, which is networked with other mobile switching centers MSC and establishes a network gateway to a fixed network PSTN.

Furthermore, the illustrated mobile switching center MSC is connected to at least one base station controller BSC. According to FIG. 1, at least two base stations BTS and one home base station HBTS are connected to the base station controller. A further home base station HBTS is connected to the mobile switching center MSC via an interface unit IU.

The mobile radio network furthermore has an associated operation and maintenance center OMC, which is connected to a mobile switching center MSC and is intended for monitoring the performance parameters of the mobile radio network, as well as for maintenance and fault monitoring. It is likewise possible to provide for autonomous operation and maintenance centers to be provided for component elements of the mobile radio network, for example a base station system.

FIG. 1 also shows a fixed network PSTN having mutually networked switching devices VE. Communications terminals KE and home base stations HBTS are connected to these switching devices VE via a subscriber connection. The subscriber connection is connected by wire to the home base station HBTS, while the connections between the subscriber connection and the switching device VE are produced by wires via an interface device IU, via optical conductors, or without wires in the sense of RITL.

Communications connections are switched in the switching devices VE by means of space/time coupling devices. Interfaces between the communications terminals KE or the home base stations HBTS and the switching device VE are designed in accordance with the ISDN (integrated services digital network) Standard (SO interface) or in analog (TAE) fashion.

There are radio interfaces between a base station BTS or a home base station HBTS and mobile stations MS, via which radio interfaces subscriber signals are transmitted from and to the mobile stations MS in the uplink and downlink directions, respectively.

In the following description, the terms cell and radio area are used as follows:

A home base station HBTS supplies a small cell, which has a considerably smaller extent than a cell of base stations BTS. The small cell is located within a cell, with the radio supply being limited to an apartment, a house or the like.

A radio area is a region which can be supplied by one or more base stations BTS or home base stations HBTS and, in consequence, is located within cells.

If supplied by a plurality of base stations BTS or home base stations HBTS, a radio area denotes the region in which cells and small cells overlap.

Figure 2:
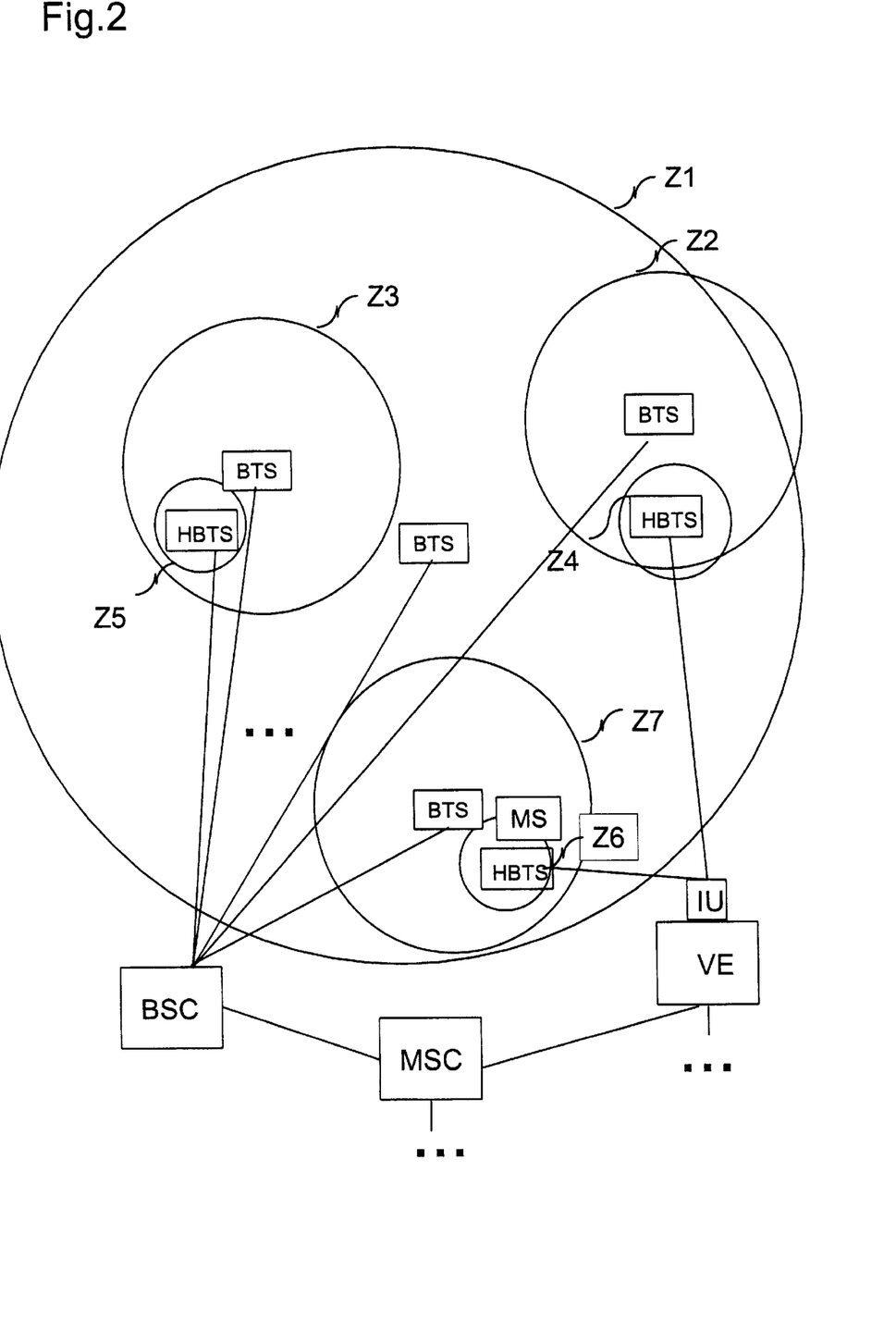
FIG. 2 is a schematic view of the cell breakdown of a mobile radio network, with additional small cells of home base stations.

FIG. 2 describes a geographic region in which cells Z1 to Z3, Z7 having different radii are available within a mobile radio network. Furthermore, three small cells Z4 to Z6 are shown, which are supplied by home base stations HBTS. The home base stations HBTS are connected either to interface devices IU of switching devices VE, or to base station controllers BSC. A mobile station MS is assigned to one or more home base stations HBTS by a second identifier K2 being available for these home base stations HBTS and denoting this mobile station MS. This second identifier K2 may be permanently stored in the home base stations HBTS, or may be called by other network components BSC, MSC, VE, OMC.

In the exemplary embodiment, the radio interfaces are a GSM radio interface in the 900 MHz frequency band, a DCS radio interface in the 1800 MHz frequency band, or a PSC radio interface in the 1900 MHz frequency band. The radio interfaces between the home base stations HBTS and the mobile stations MS use the same frequency band. A frequency band, for example a part of the E-GSM band, a time slot or a code set for a CDMA (code division multiple access) transmission may also be reserved regionally for the radio interface between the home base station HBTS and the mobile station MS. No frequency planning is required for this radio interface.

Figure 3:
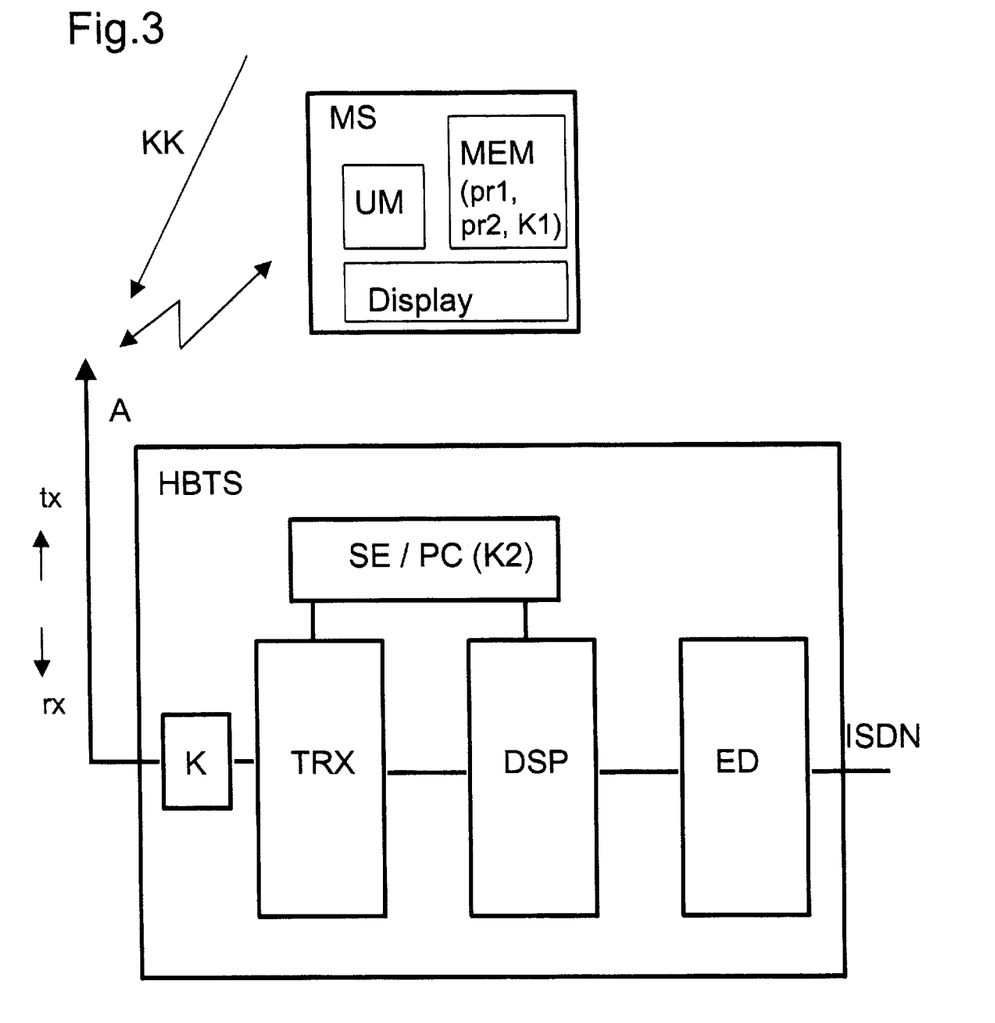
FIG. 3 is a schematic block diagram of a home base station.

The layout of a home base station HBTS will now be described with reference to FIG. 3.

An antenna unit A is connected to a transmitting/receiving device TRX via an antenna coupling unit K. The transmitting/receiving device TRX provides the functions for preamplification and power amplification, the downlink and uplink mixing between the frequency band of the radio-frequency radio transmission and baseband, the demodulation and modulation, the filtering, the analog/digital conversion and the digital/analog conversion for received signals rx and transmission signals tx.

The transmission via the radio interface is prepared for a carrier, that is to say a frequency band, by the transceiver or transmitting/receiving device TRX.

A signal processing device DSP is connected to the transmitting/receiving device TRX. The device DSP is a digital signal processor that carries out digital filtering, de-emphasis, formatting of radio blocks, interleaving and de-interleaving of radio blocks, decryption and encryption, and other channel-oriented monitoring functions for the received signals rx and the transmission signals tx.

The interface between the device for signal processing DSP and the wire-based ISDN network is provided via a device for data rate conversion ED. This device for data rate conversion ED is used to convert a mobile radio network data rate, for example 13 kbit/s for the voice coder/decoder, to a data rate for the wire-based connection, for example 64 kbit/s PCM; if required, conversion for an analog connection is carried out. For an ISDN connection, a B-channel is evaluated and operated, that is to say that controls the setting up of a connection, the maintenance of a connection, and the clearing of a connection.

The home base station HBTS furthermore contains a device SE for synchronization of the radio transmission, and a device PC for transmission power adjustment. These devices are in the form of software in a digital signal processor, and likewise control functions of the transmitting/receiving device TRX. Since the distance between the mobile station MS and the home base station HBTS is generally less than that to a base station BTS in the mobile radio network, the transmission power levels of the mobile station MS and of the home base station HBTS may also be less for a communications connection between them. The home base station HBTS signals this to the mobile station MS. This also results in the advantage that the power consumption of the mobile station MS can be reduced for a communication relationship via a home base station HBTS.

The power for the uplink and downlink directions can be set independently of one another. Calculation and signaling of the values for transmission power adjustment are carried out in accordance with J. Biala, "Mobilfunk und intelligente Netze" [Mobile Radio and Intelligent Networks] Vieweg Verlag Wiesbaden/ Braunschweig, 1995, page 106. However, for simplicity, it is also possible to provide a standard value for the transmission power level for a communications connection to a home base station HBTS.

The device SE for synchronization synchronizes the radio transmission of the home base station HBTS. The signals rx received by the transmitting/receiving device from an organization channel KK in the mobile radio network are evaluated for this purpose. The synchronization is carried out such that the frequency of the transmitted or received carrier is corrected, and time discrepancies in the radio transmission of the home base station HBTS are corrected with respect to the transmission of the mobile radio network. Details relating to synchronization, for example to a frequency correction channel (FCCH) and a synchronization channel (SCH) in the GSM mobile radio network can be found in the afore-mentioned book by J. Biala, "Mobilfunk und Intelligente Netze", pages 270–71.

A mobile station MS likewise carries out transmission power adjustment and synchronization. In addition to the known devices in a mobile station, for example, the S6 mobile radio terminal from Siemens AG, switching means UM are provided for switching over between a first operating mode pr1 that relates to the home base station HBTS, and a second operating mode pr2 that relates to the other base stations BTS in the mobile radio network. The currently preferred operating mode pr1 or pr2, which may depend on customer preferences or the current transmission conditions, is stored in the memory means MEM and may be used as a selection criterion when the setting up of a connection is initiated by the mobile station MS. Furthermore, a mobile-station-specific identifier K1 is stored in the memory means MEM. The stored values can be displayed on a display. If the switching means UM are in the form of a keypad, then the identifiers K1, K2 can be influenced via inputs in the mobile station MS, and the validity notes can be entered. The identifiers K1, K2 and the validity note may, however, also be selected from a set of values by the home base station HBTS and just reported to the mobile station MS, possibly together with the telephone number of the home base station HBTS, for display and/or storage.

Figure 4:
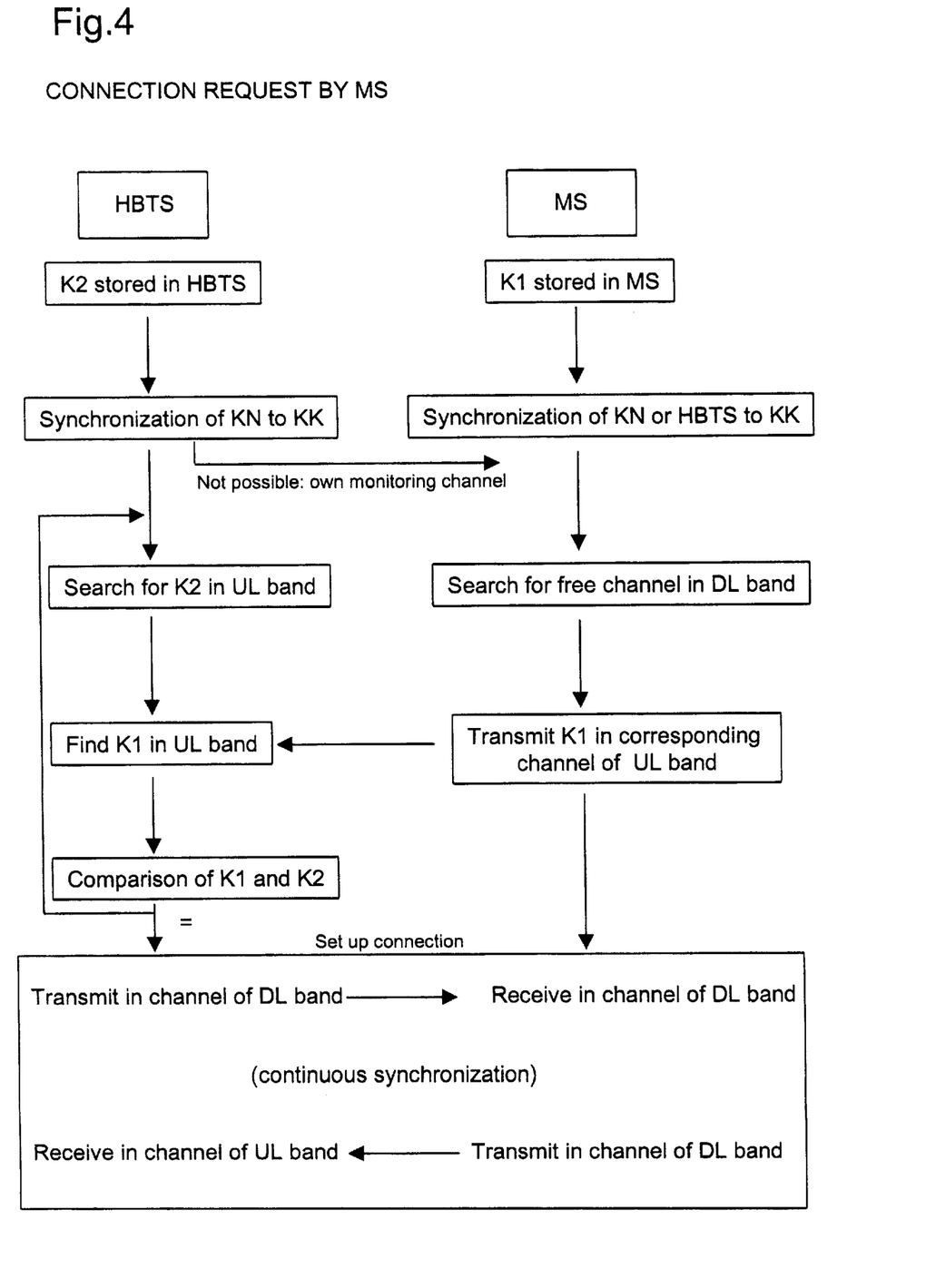
FIG. 4 is a flowchart illustrating a process of setting up a connection from a mobile station.

Referring now to the flowchart of FIG. 4, there is shown the sequence of setting up of a connection initiated by the mobile station MS, when the mobile station is located in the radio area of its associated home base station HBTS. At least one second identifier K2 is stored in the home base station HBTS and denotes a mobile station MS for which the home base station HBTS is registered as a subscriber connection. Both the home base station HBTS and the mobile station MS are synchronized by evaluation of the organization channel KK of the mobile radio network KN.

The home base station HBTS is assigned a carrier in a frequency band DL in the downlink direction, and a carrier in a frequency band UL in the uplink direction. The time slot, frequency and subscriber code, to which the mobile station MS and the home base station HBTS refer, are associated between channels in the bands DL, UL in the uplink and downlink direction.

The mobile station MS searches for a free channel in the band DL in the downlink direction. If a free channel is available, then the mobile station MS transmits a message with the first identifier KS in the channel corresponding to the downlink direction, in the band UL in the uplink direction. In consequence, there is no need to transmit an RACH (random access control channel) when using the GSM Standard, and the first identifier can be transmitted in the form of a normal radio block.

The home base station HBTS searches for the second identifier K2 in the band UL in the uplink direction, and receives the message with the first identifier K1. The first and second identifiers are compared with one another and, if they match, a connection is set up. The home base station HBTS transmits in the down link direction and receives in the uplink direction, and, in a manner corresponding to this, the mobile station MS transmits in the uplink direction and receives in the downlink direction. Even during the connection, synchronization is carried out continuously to the organization channel KK in the mobile radio network KN. If synchronization to the organization channel KK in the mobile radio network KN is impossible or is too inaccurate, then an additional monitoring channel is set up to the home base station HBTS, and is used by the mobile station MS.

If it has not been possible to set up a connection, the transmission of the first identifier K1 is repeated after a randomly determined time interval. If this remains unsuccessful over a lengthy time period, then the setting up of the connection is terminated.

Figure 5:
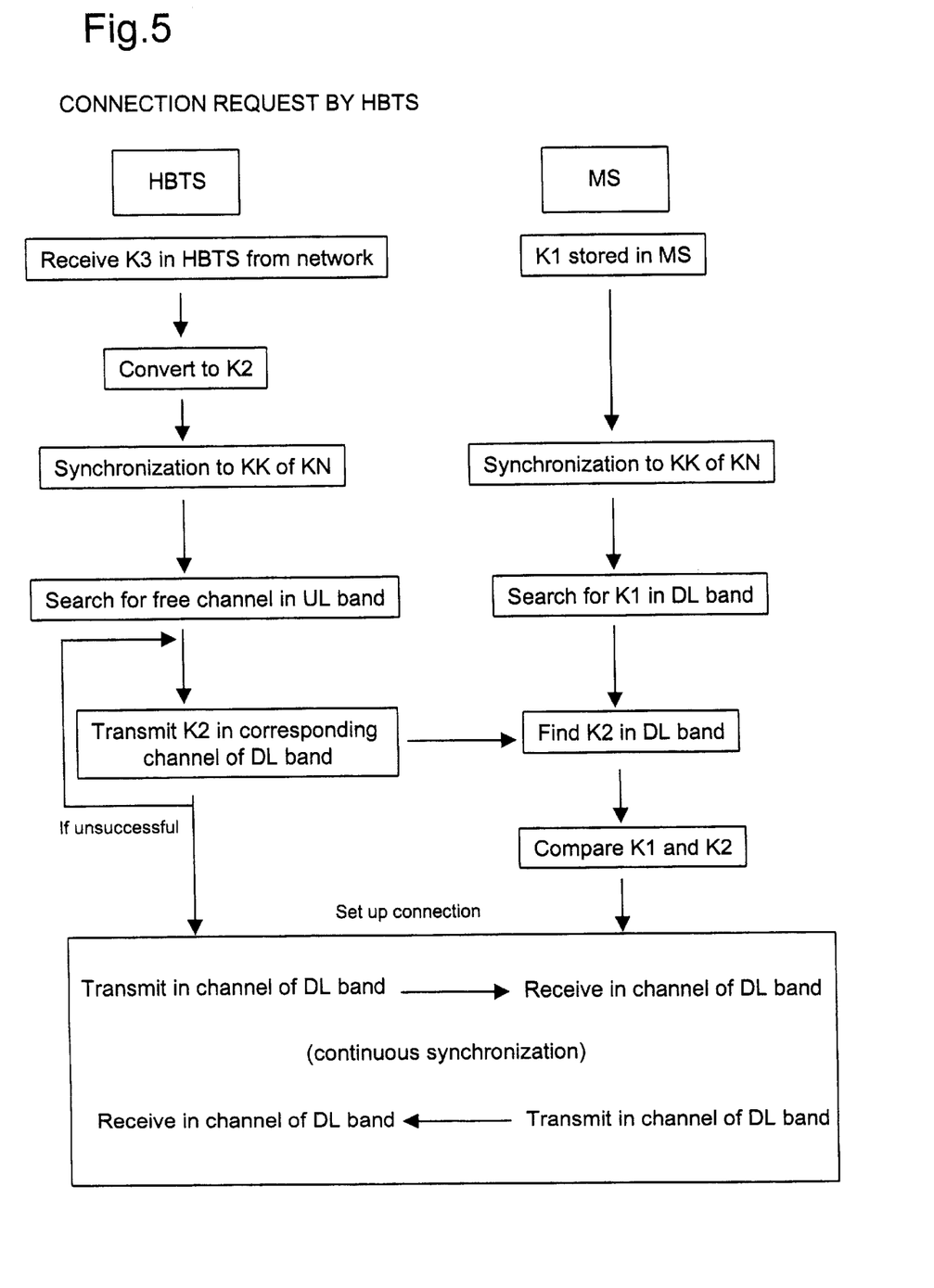
FIG. 5 is a flowchart illustrating a process of setting up a connection from a home base station.

FIG. 5 illustrates the setting up of a connection initiated by the home base station HBTS. The home base station HBTS receives a third identifier K3 (for example, the ringing tone) from the communications network to which it is connected, and this stimulates the setting up of a connection. The signal processing means in the home base station HBTS convert the third identifier K3 into a second identifier K2. The second identifier K2, which is obtained from the third identifier K3 (plurality of terminals) or is permanently stored, denotes for a home base station the called mobile station MS for which the home base station HBTS is registered as the subscriber connection. The home base station HBTS and the mobile station MS are in turn synchronized by evaluating the organization channel KK of the mobile radio network KN.

The home base station HBTS searches for a free channel in the band UL in the uplink direction. If a free channel is available, then the home base station HBTS transmits a message with the second identifier K2 in the corresponding channel in the band DL in the downlink direction. The mobile station MS searches for the first identifier K1 in the band DL in the downlink direction, and receives the message with the second identifier K2. The first and second identifiers are compared with one another and, if they match, a connection is set up as already described.

We claim:

1. A method of establishing a connection for a mobile station in a mobile radio network, wherein a plurality of base stations are provided in the mobile radio network, and at least one home base station for supplying small cells, and wherein the mobile stations transmit to the home base station in an uplink direction, and the home base station transmits to the mobile station in a downlink direction, the method which comprises:

synchronizing a mobile station and a home base station with a base station of the mobile radio network based on an evaluation of an organization channel in the mobile radio network;

transmitting with the mobile station a message in the uplink direction to the home base station in a frequency band of the home base station, the message containing a mobile-station-specific first identifier;

receiving and evaluating the message by the home base station; and if the first identifier matches a second identifier registered for the home base station, setting up the connection between the home base station and the mobile station.

2. The method according to claim 1, which comprises providing with the mobile station a changeover between a first operating mode relevant to the home base station and a second operating mode relevant to the base stations in the mobile radio network.

3. A method of establishing a connection for a mobile station in a mobile radio network, wherein a plurality of base stations are provided in the mobile radio network, and at least one home base station for supplying small cells, and wherein the mobile stations transmit to the home base station in an uplink direction, and the home base station transmits to the mobile station in a downlink direction, the method which comprises:

synchronizing a mobile station and a home base station with a base station of the mobile radio network based on an evaluation of an organization channel in the mobile radio network;

selecting a free channel with a home base station;

transmitting a message with the home base station in a downlink direction, the message containing a mobile-station-specific second identifier;

receiving and evaluating the message in the mobile station; and if the second identifier matches a first identifier assigned to the mobile station, setting up a connection between the home base station and the mobile station.

4. The method according to claim 3, which comprises receiving a third identifier in the home base station from the communications network, and deriving therefrom the second identifier.

5. A home base station connected to a subscriber connection of a communications network, comprising:

a transmitting/receiving device for a carrier for transmitting and receiving radio-frequency signals via a radio interface to a mobile station in accordance with a digital mobile radio standard;

a signal processing device connected to said transmitting/receiving device;

a device connected to said signal processing device for data rate conversion between a data rate of the mobile radio standard and a data rate of the communications network; and a device for synchronizing a radio transmission of the mobile station and the home base station with a base station of a mobile radio network by evaluation of an organization channel in the mobile radio network.

6. The home base station according to claim 5, wherein said signal processing device is programmed to evaluate a message containing a mobile-station-specific first identifier received from a mobile station and, if the first identifier matches a second identifier registered for the home base station, to authorize a connection to be set up to the mobile station.

7. The home base station according to claim 5, which comprises a device for transmission power adjustment connected to said transmitting/receiving device.

8. The home base station according to claim 7, wherein said device for transmission power adjustment likewise controls a transmission power of the mobile station via a radio interface.

9. The home base station according to claim 5, wherein said transmitting/receiving device has an additional monitoring channel.

10. The home base station according to claim 5, which further comprises a plug-in card for storing therein the second identifier.

11. The home base station according to claim 5, wherein the second identifier carries a validity tag.

12. The home base station according to claim 5, wherein the free channel is selected in a frequency band assigned to the home base station.

* * * * *